(12) United States Patent
Maennicke et al.

(10) Patent No.: US 10,422,857 B2
(45) Date of Patent: Sep. 24, 2019

(54) DEVICE FOR ASCERTAINING A MISALIGNMENT OF A DETECTION UNIT FASTENED ON A VEHICLE

(71) Applicant: Robert Bosch GmbH, Stuttgart (DE)

(72) Inventors: Nils Stefan Maennicke, Herrenberg (DE); Igor Wetoschkin, Freiberg (DE); Marcus Steffen Reiher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 15/448,833

(22) Filed: Mar. 3, 2017

(65) Prior Publication Data

US 2017/0261600 A1    Sep. 14, 2017

(30) Foreign Application Priority Data

Mar. 11, 2016   (DE) .......................... 10 2016 204 011

(51) Int. Cl.
  *G01S 7/40*    (2006.01)
  *G01S 13/93*   (2006.01)
  *G01S 13/00*   (2006.01)

(52) U.S. Cl.
  CPC .......... *G01S 7/4026* (2013.01); *G01S 13/931* (2013.01); *G01S 2007/403* (2013.01); *G01S 2007/4091* (2013.01); *G01S 2013/9375* (2013.01); *G01S 2013/9378* (2013.01)

(58) Field of Classification Search
  None
  See application file for complete search history.

(56) References Cited

U.S. PATENT DOCUMENTS

| | | | | |
|---|---|---|---|---|
| 5,313,262 | A | * | 5/1994 | Leonard ................ G01S 17/936 180/169 |
| 8,930,063 | B2 | * | 1/2015 | Gandhi ................. G01S 13/931 180/128 |
| 9,201,424 | B1 | * | 12/2015 | Ogale ....................... G06T 7/80 |
| 9,726,754 | B2 | * | 8/2017 | Massanell ............. G01S 7/4972 |
| 2007/0182623 | A1 | * | 8/2007 | Zeng ..................... G01S 7/4026 342/174 |
| 2014/0324336 | A1 | * | 10/2014 | Prokhorov ......... G01C 21/3602 701/445 |

FOREIGN PATENT DOCUMENTS

DE        102007001367 A1    7/2008

* cited by examiner

*Primary Examiner* — Bernarr E Gregory
(74) *Attorney, Agent, or Firm* — Norton Rose Fulbright US LLP; Gerard Messina

(57) ABSTRACT

A method and a device for ascertaining a misalignment of at least one detection unit fastened on a vehicle with respect to the intended sensor main beam direction. The device includes at least one detection unit which emits signals and receives partial signals which have been reflected on objects, and ascertains the distance and the azimuth angle of the reflecting objects, and further includes an evaluation unit, to which the ascertained positions of the at least one detection unit are forwarded, and the determination of a misalignment takes place in the evaluation unit by comparing the stored alignment of the sensor main beam direction and the ascertained angle of the object extension with respect to the sensor main beam direction, this taking place under the assumption that the vehicle is moving on average, in parallel to the object extension, for the period during which the misalignment is ascertained.

14 Claims, 3 Drawing Sheets

DEVICE FOR ASCERTAINING A MISALIGNMENT OF A DETECTION UNIT FASTENED ON A VEHICLE

CROSS REFERENCE

The present application claims the benefit under 35 U.S.C. § 119 of German Patent Application No. DE 102016204011.1 filed on Mar. 11, 2016, which is expressly incorporated herein by reference in its entirety.

FIELD

The present invention relates to a method and a device for ascertaining a misalignment of at least one detection unit fastened on a vehicle with respect to the intended sensor main beam direction, this device including at least one detection unit which emits signals and receives partial signals which have been reflected on objects, and ascertains the distance and the azimuth angle of the reflecting objects, and further including an evaluation unit, to which the ascertained positions of the at least one detection unit are routed, and the determination of a misalignment takes place in the evaluation unit by comparing the stored alignment of the sensor main beam direction and the ascertained angle of the object extension with respect to the sensor main beam direction, this taking place under the assumption that the vehicle is moving on average, in parallel to the object extension, for the period during which the misalignment is ascertained.

BACKGROUND INFORMATION

German Patent Application No. DE 10 2007 001 367 A1 describes a method and a measuring section for aligning a distance sensor on a vehicle, the measuring section including a straight roadway and a road marker at one end of the roadway or road markers situated on a shoulder delimiting the roadway. A position of a road marker is ascertained and actual data related thereto are stored in a memory. The actual data are compared to setpoint data stored in the memory and, therefore, an alignment of the sensor is determined. If a misalignment is present, the sensor is aligned with the aid of a software-based calibration.

German Patent Application No. DE 10 2011 081 391 A1 describes a method for detecting obstructions in the air surrounding a vehicle, line structures being determined in at least one image area of an image of surroundings of the vehicle in a first step, thereafter a position of a first alignment area of first line structures and a position of a second alignment area of second line structures being determined and, in one further step, obstructions depicted in the image being ascertained, which represent objects located in the vehicle surroundings. In this case, the determination of the alignment point is advantageously carried out on the basis of the detected guardrails of the traveled road, which are recorded with the aid of a video camera mounted in the vehicle. A disadvantage of this method is that, in order to align a sensor which is not a video sensor (for example, a radar sensor), the use of a video sensor is additionally required and the determination of the misalignment of a sensor may not be carried out at any arbitrary time, and this requires a certain minimum amount of time. In addition, a misalignment may be ascertained and a recalibration may be carried out only for sensors which are aligned in parallel to the direction of travel. Vehicle sensors which are installed, for example, on vehicles having an alignment of the sensor main beam direction at a 45° angle or another acute angle, i.e., an angle between 0 and 90°, are unable to carry out this method.

SUMMARY

An object of the present invention is to provide a method and a device, with the aid of which a rapid and precise estimation of the misalignment of vehicle sensors is made possible.

Advantageous refinements and embodiments are described herein.

In accordance with the present invention, the estimation of the misalignment and a possible recalibration of the sensors should also be made possible when the sensors are installed on the vehicle corners in such a way that their sensor main beam directions are aligned diagonally at a 45° angle or in another spatial direction between 0° and 90° with respect to the direction of travel of the vehicle.

It is advantageously provided that, in the case of vehicle-surroundings sensors whose main beam direction is not aligned in parallel to the direction of travel and which are known as so-called corner or rear sensors, the misalignment angle is estimated on the basis of the deviation between a prediction and a measurement of stationary targets while passing thereby. Suitable stationary targets such as posts of guardrails or parked vehicles on the side of the roadway may be used for sensors which are aligned in the direction of travel of the vehicle. Therefore, as an alternative, the determination of the misalignment may take place via the ascertainment of a measured detection angle of a guardrail or a concrete wall in the area to the side of the vehicle, since the reflection position on a guardrail or concrete wall moves along in parallel with the vehicle. A measurement carried out even for a few seconds is therefore very significant for the determination for the estimation of a misalignment angle and, therefore, a high level of reliability may be achieved in the ascertainment of the misalignment.

Advantageously, the detection unit is a radar sensor which operates in the microwave range or in the millimeter-wave range. Such sensors may be utilized, for example, for adaptive cruise control, for triggering emergency braking functions, for triggering emergency steering maneuvers, or for further comfort or safety functions.

It is also advantageous if multiple detection units are mounted on the vehicle. These multiple detection units may be mounted, for example, on vehicle corners, the main beam directions of the sensors being aligned at an angle between 0° and 90° with respect to the vehicle longitudinal axis.

It is also advantageous if the detection areas of adjacent detection units at least partially overlap. As a result, it is possible that one and the same object in the vehicle surroundings is simultaneously detected by two or more sensors and, therefore, a mutual plausibility check of the ascertained measured values and calculation results is made possible.

It is also advantageous if the knowledge of the instantaneous misalignment angle of a detection unit is used for ascertaining the misalignment angle of an adjacently situated detection unit. In such an approach, which is also known as a cross misalignment, the misalignment angle known by the one sensor is transmitted to the adjacent sensor, so that this sensor may obtain a more accurate result of the misalignment angle or so that the misalignment result may be ascertained more rapidly on the basis of the knowledge of the misalignment angle of the adjacent sensor and the use of a reflecting object in the shared, overlapping detection area.

It is also advantageous if, in order to ascertain the misalignment angle, a comparison of the stored alignment of the sensor main beam direction and the ascertained angle of the object extension with respect to the sensor main beam direction is carried out by ascertaining the difference angle between the vehicle longitudinal axis and the sensor main beam direction and, from this, subtracting the angle at which the detection unit ascertains the reflected partial signals of the transmission signals reflected on the extended object. Therefore, the device according to the present invention is designed in such a way that the misalignment angle is ascertained in the device by way of the device being designed for carrying out a comparison of the stored orientation of the sensor main beam direction with the ascertained angle of the object extension with respect to the sensor main beam direction, by ascertaining the difference angle between the vehicle longitudinal axis and the sensor main beam direction and, from this, subtracting the angle at which the reflected partial signals of the transmission signals reflected on the extended object were measured by the detection unit.

It is also advantageous if the misalignment is ascertained when specific object situations are detected. Such specific object situations are present, for example, when an extended object has been detected next to the host vehicle on the right, in the direction of travel, an extended object has been detected next to the host vehicle on the left, in the direction of travel, or when extended objects have been detected next to the vehicle on the left and on the right, in the direction of travel. Extended objects are considered to be, in particular, structural measures which make it possible for a reflection point of the signals transmitted by the detection unit to move along with the host vehicle in parallel to the vehicle direction, which is possible, in particular, in the case of guardrails which extend in parallel to the roadway, a concrete wall which delimits the roadway, a bridge railing, or a tunnel wall. Therefore, a specific object situation is detected when signal reflections of the signal transmitted with the aid of the detection unit travel along on the extended object during the travel in parallel to the direction of travel and at the same velocity v.

It is also advantageous if the ascertained misalignment angle is used for correcting the instantaneously measured object angle. As a result, it is possible to recalibrate a misaligned detection unit by ascertaining an instantaneous misalignment angle and adding the ascertained misalignment angle, as the angle offset value, to the measured values, or subtracting the ascertained misalignment angle, as the angle offset value, from the measured values, and, therefore, to be able to perform an error-free correction of angle positions detected in the future.

It is also possible to monitor the ascertained misalignment angle and to shut off the detection unit if a predefined threshold value has been exceeded. This is possible, in particular, when the ascertained misalignment angle has become so great, as a result of a minor fender bender, or the host vehicle coming into light contact with another vehicle, for example, that a recalibration is not possible and, due to the size of the ascertained misalignment angle, a workshop must be visited, in order to restore the proper operation of the sensor.

It is also advantageous if the misalignment angle used for correcting the instantaneously measured object angle is ascertained with the aid of a long-term filtering of the measured values. In the case in particular, in which a recalibration of the sensor is supposed to take place with the aid of the ascertained misalignment angle, it is advantageous to ascertain and average the misalignment angle over a longer time period, in order to obtain a reliable misalignment angle value. A longer time period in this case is a time period of approximately one half of an hour to one hour, although time periods of more than one hour, for example, two or three hours, are also advantageous.

It is also advantageous if the misalignment angle to be ascertained for the shutoff is ascertained with the aid of a short-term filtering of the measured values. If the ascertained misalignment angle is so great that a recalibration of the sensor should not take place and, instead, the detection unit should be shut off until it is repaired in a workshop, a rapid reaction in the form of a shutoff is advantageous. Therefore, such a shutoff reaction should take place with the aid of a short-term filtering by ascertaining and averaging the misalignment angle only over a short time period. A short time period in this case is intended to mean from one minute to several minutes and, in the broadest sense, a time period of up to approximately half an hour.

It is also advantageous if the position of appearing objects is used for ascertaining a misalignment, the objects being detected in the range of the greatest measuring quality. In this case, it is advantageous that a detection unit has the greatest measuring quality in the subarea of the detection area where the detection unit has the greatest range and/or the highest angular accuracy.

Detection units usually have various ranges and various angle-measuring accuracies depending on the angular direction, so that the highest measuring accuracy and, therefore, the greatest reliability is achieved when the reflecting object is detected within the range of the detection area of the detection unit in which the sensor has the greatest range or the highest angular accuracy. Therefore, the relative position of the detected objects within a detection area may also be weighted as a function of the underlying measuring quality. In this way, the result may be utilized more rapidly for calibration or shutoff in the event of a reliable measurement than in the event of a detection of objects in subareas of the detection area having a lower measuring quality.

When multiple detection units are mounted on a vehicle, the detection areas of adjacent detection units at least partially overlapping, it is also advantageous that the knowledge of the instantaneous misalignment angle of a detection unit is utilized for ascertaining the misalignment angle of the adjacently situated detection unit. Such a utilization of adjacent measured values is also referred to as a cross misalignment and allows for a mutual plausibility check of ascertained misalignment angles and allows for a reliable estimation of the misalignment angle or a more rapid ascertainment of an ultimately resulting misalignment angle with the aid of known, adjacent values if the detected object lies in the overlap area of the two detection areas.

Of particular significance is the implementation of the method according to the present invention in the form of a control element which is provided for a control unit of a surroundings-detection device, for example, for blind-spot detection or for lane-change assistance of a motor vehicle. In this case, a program is stored on the control element, which is able to run on a computer, in particular on a microprocessor or signal processor, and is suitable for carrying out the method according to the present invention. In this case, the present invention is therefore implemented in the form of a program stored on the control element, so that this control element provided with the program represents the present invention in the same way as the method for whose implementation the program is suitable. An electrical memory medium, in particular, may be used as the control element, for example a read-only memory.

Further features, possible applications, and advantages of the present invention result from the following description of exemplary embodiments of the present invention, which are represented in the figures. In this case, all described or represented features, either alone or in arbitrary combination, are the subject matter of the present invention, irrespective of their wording or representation in the description herein or in the figures.

BRIEF DESCRIPTION OF THE DRAWINGS

Exemplary embodiments of the present invention are described in below with reference to the figures.

DETAILED DESCRIPTION OF EXAMPLE EMBODIMENTS

Figure 1:
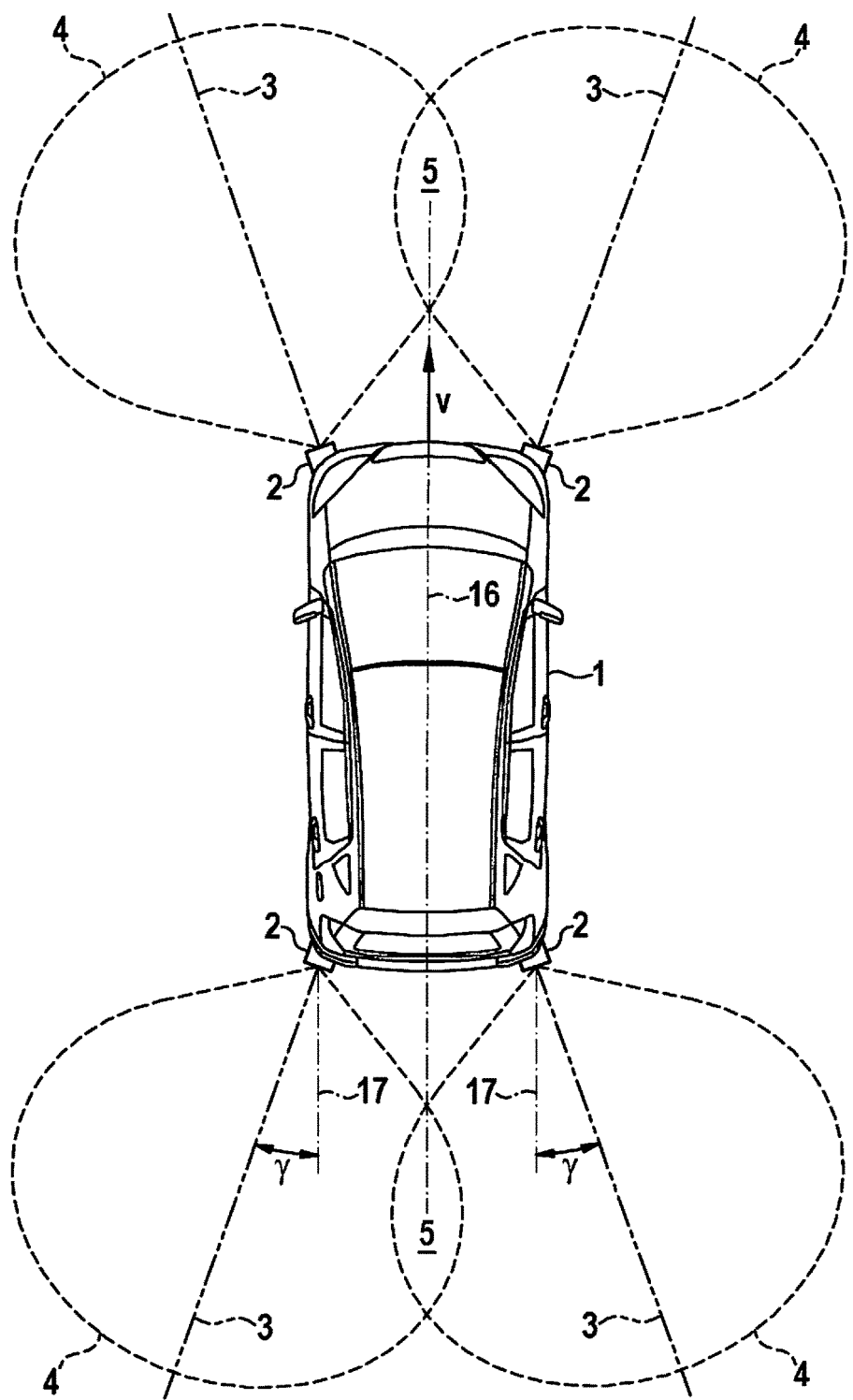
FIG. 1 shows a schematic top view of a vehicle including the system according to the present invention.

FIG. 1 schematically shows a top view of a vehicle 1 which includes one detection unit 2 on each of the four vehicle corners. Detection units 2 may be, for example, ultrasonic sensors, radar sensors or laser sensors which emit transmission signals (Tx) 6 and receive received signals (Rx) 7 reflected on objects within detection areas 4. Due to the transceiver characteristics of detection units 2, a detection area 4 results for each sensor. The direction in which detection unit 2 has the greatest range within detection area 4 is mostly defined as sensor main beam direction 3. Sensor main beam directions 3, which mostly also form the axis of symmetry of detection area 4, are represented as lines through origin, through detection units 2, in FIG. 1. The alignments of sensor main beam directions 3 in this case are not intended to be in parallel to vehicle longitudinal axis 16, which would then be aligned in parallel to direction of travel v of vehicle 1, but rather deviate at an angle between 0° and 90° with respect to vehicle longitudinal axis 16. In this case, the alignment angles on the left vehicle side are mostly mirror-symmetrical with respect to the alignment angles of the sensors on the right vehicle side, so that vehicle longitudinal axis 16 advantageously forms an axis of symmetry with respect to the sensor arrangement of detection units 2 and with respect to their sensor main beam directions 3.

Detection areas 4 of front detection units 2 and detection areas 4 of rear detection units 2 overlap ahead of vehicle 1 in direction of travel v and behind vehicle 1, respectively, and form overlap areas 5. Detection areas 4 of detection units 2 may also be configured, of course, in such a way that overlap areas 5 may also form next to vehicle 1, on the left and on the right as viewed in direction of travel v, which is not represented in FIG. 1, however, for the sake of clarity. Moreover, with respect to detection units 2 mounted on the rear of the vehicle, two vehicle longitudinal axes 17, shifted in parallel, are aligned in parallel to vehicle longitudinal axis 16, and each extend through detection units 2. These vehicle longitudinal axes 17, shifted in parallel, form an angle γ with the particular assigned sensor main beam directions 3, which may be defined, in each case, as the angular difference between vehicle longitudinal axis 16 and sensor main beam direction 3. Within the scope of the present invention, deviations of the actual sensor main beam directions 3 from the alignments of sensor main beam directions 3 provided due to the design are to be detected and gathered in terms of the order of magnitude thereof. Depending on the extent of the deviation, a compensation of these misalignments is carried out and, if a maximum compensation range is exceeded, a shutoff of particular detection unit 2 is carried out.

Figure 2:
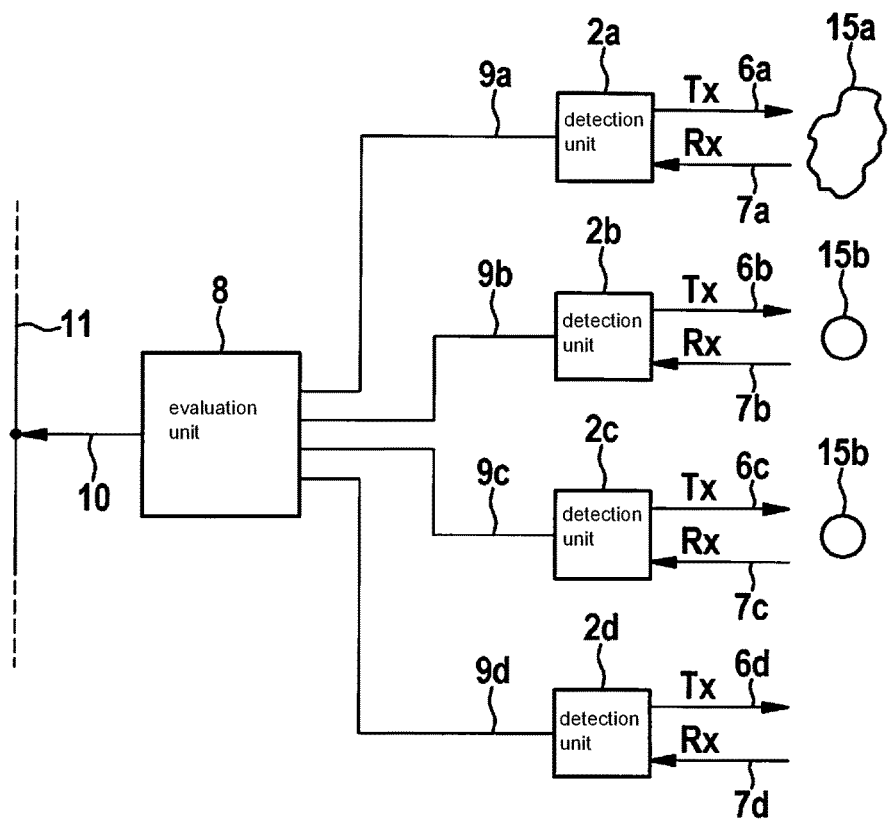
FIG. 2 shows a schematic block diagram of one specific embodiment of the device according to the present invention.

The schematic configuration of the device according to the present invention is represented in FIG. 2 with the aid of block diagrams. Four detection units 2a, 2b, 2c, 2d are shown, which each emit a transmission signal Tx 6a, 6b, 6c, 6d, into their particular detection area 4, in order to detect objects which may be present within detection area 4. Objects 15a, 15b are provided within detection areas 4, on which transmission signals Tx 6a, 6b, 6c are partially reflected and are received as received signals Rx 7a, 7b, 7c by detection units 2a, 2b, 2c. In this case, object 15a is represented as an object which is detected by detection unit 2a. Object 15b, which is detected both by detection unit 2b and by detection unit 2c in this case, should be one and the same object in this case, which is detected simultaneously by two detection units 2b, 2c and is therefore located in overlap area 5 of two detection areas 4. According to the representation in FIG. 2, there is no object present for detection unit 2d to detect. The received signals are evaluated in particular detection units 2a, 2b, 2c, 2d, and the corresponding object data are forwarded to an evaluation unit 8 via data lines 9a, 9b, 9c, 9d. This evaluation unit 8 is represented as a central evaluation unit and receives from detection units 2a, 2b, 2c, 2d the positions of objects 15a, 15b detected in detection areas 4. On the basis of the relative position data from detection units 2a to 2d, evaluation unit 8 may calculate object coordinates for objects 15a, 15b, which are then transferred to a vehicle-based coordinate system. This evaluation of the object data and the ascertainment of object data in the vehicle system may also optionally take place in detection units 2a through 2d. In this case, it is detected, for example, that object 15b was detected simultaneously by two detection units 2b, 2c and lies in overlap area 5 of two detection areas 4. The coordinates of detected objects 15a, 15b may be routed via an interface 10 of a data exchange system to data exchange system 11 which may be designed, for example, as a bus system, in particular as a CAN bus. The data routed to data exchange system 11 via interface 10 may be utilized in driver assistance systems or driver safety systems for comfort functions or safety functions. In order to ensure the reliable operation of the system, sensor main beam directions 3 of individual detection units 2a to 2d must be regularly monitored for correct alignment. This monitoring of the misalignment or the ascertainment of the instantaneous misalignment angle advantageously takes place, in this case, in individual detection units 2a through 2d. Alternatively, it is also possible, however, that the monitoring and ascertainment of the instantaneous misalignment angle takes place centrally in evaluation unit 8. For this purpose, it is continuously monitored whether specific object situations are present, i.e., in particular whether extended objects are detected on the left or on the right in the direction of travel, or on both sides of the vehicle. If such a specific object situation is detected, the measured angles of the object reflections with respect to particular sensor main beam direction 3 of detection area 4 are measured and are averaged over a longer time period.

In addition, the intended installation angle of particular detection unit 2, which indicates the difference angle between vehicle longitudinal axis 16 and sensor main beam direction 3 of detection units 2, may be stored. The position of the object reflection with respect to vehicle longitudinal axis 16 may be indicated on the basis of the difference between these two angle values. In the detected specific object situation, namely the detection of an extended object such as, for example, a guardrail, a concrete wall, a bridge railing, a tunnel wall, or a similar structure on the edge of the road, transmission signals Tx from detection units 2 are reflected back on the object surface at a right angle and are received as received signals Rx. As a result, the object reflection points are positioned at an angle of approximately exactly 90° with respect to vehicle longitudinal axis 16. If one subtracts 90° therefrom or adds 90° thereto, depending on the vehicle side and depending on the sign orientation of the detection areas, an averaged angle value is obtained, which corresponds to the averaged misalignment angle. A deviation on the one vehicle side toward positive angular deviations and a deviation having approximately the same order of magnitude on the other side of the vehicle toward negative angle values allows for a cross adjustment between detection unit 2 mounted on the left side of vehicle 1 and detection unit 2 mounted on the right side of vehicle 1.

Figure 3:
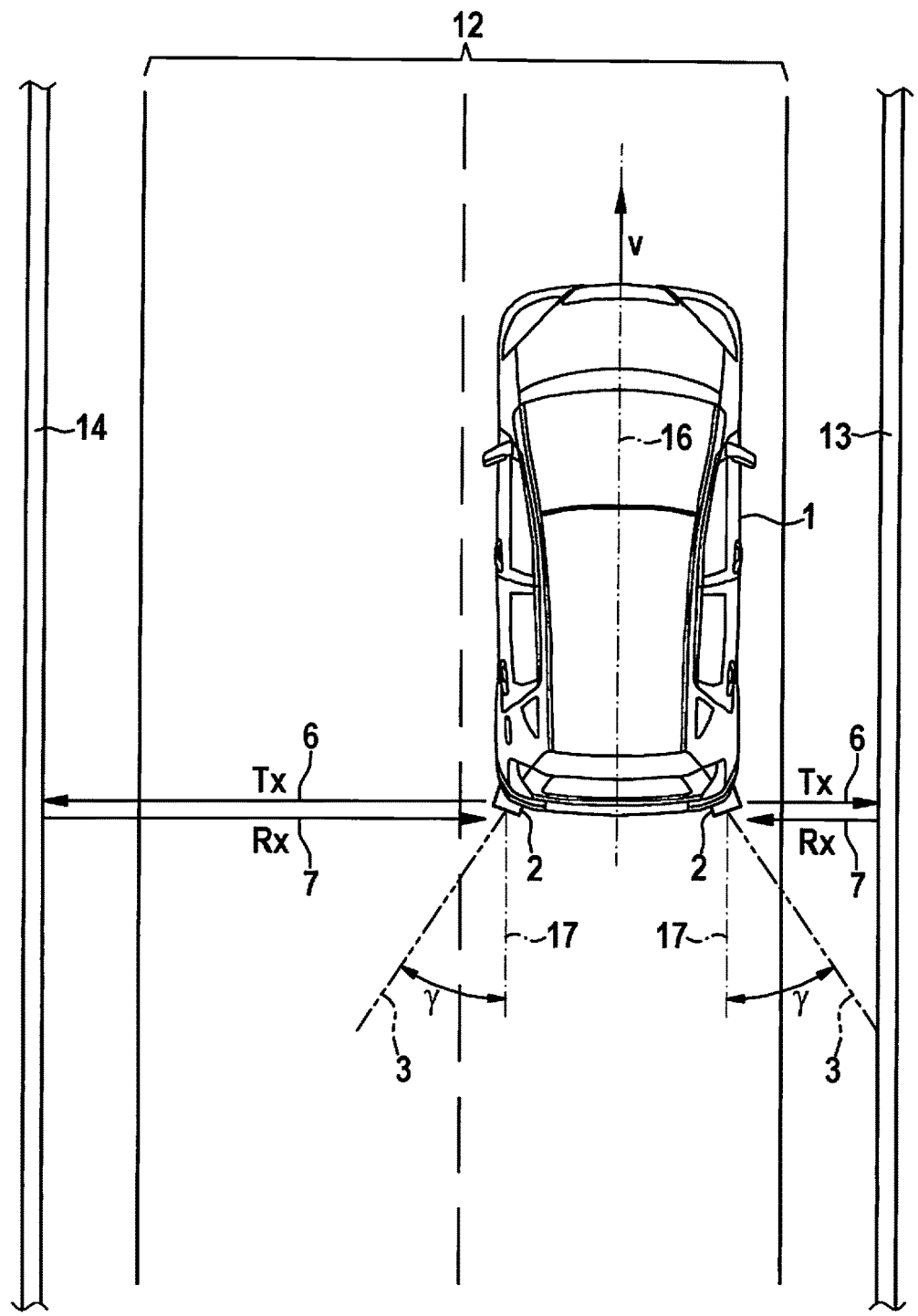
FIG. 3 shows one exemplary driving situation for describing the method according to the present invention and the device according to the present invention.

This measuring method is also represented in FIG. 3 by way of example. Vehicle 1 is also represented, which moves at velocity v in the direction of the arrow in a lane of road 12. Vehicle longitudinal axis 16 is represented in the center of the vehicle by a dash-dotted line. An extended object 13, for example, a guardrail, is represented on the right side of the vehicle, in parallel to the road. A further extended object 14 is represented on the left side of the vehicle, likewise in parallel to direction of travel v of vehicle 1, which may likewise be a guardrail or a concrete wall. In addition, detection units 2 are mounted on both rear vehicle corners, which have approximately diagonally aligned sensor main beam directions 3, but which may also have other angle values between 0° and 90°. These main beam directions 3 are aligned symmetrically at an angle γ with respect to auxiliary axes 17 which are situated in parallel to the vehicle longitudinal axis and extend through detection units 2.

Due to the emission of transmission signals Tx 6 by detection units 2, radar waves or microwaves, for example, are radiated into the vehicle surroundings and are partially reflected on extended objects 13, 14. These reflected partial waves 7 are received by detection units 2 as received signals Rx, and their relative angle with respect to particular sensor main beam direction 3 is measured. On the basis of the knowledge of this object angle and the difference angle γ, and on the basis of the knowledge that the object reflections on extended objects 13 and 14 are reflected at a right angle, an instantaneous misalignment angle may be determined and may be ascertained for a predetermined time period. On the basis of the knowledge of the individual misalignment angle values and on the basis of the knowledge of the deviations on the left side of vehicle 1 and on the right side of vehicle 1, the alignments of main beam directions 3 of detection units 2 may be recalibrated, since their intended alignment with respect to vehicle longitudinal axis 16 is known in the sensors. The calibration takes place in this case in such a way that a deviation of the averaged object angles is added to all measured object angles as a compensation angle or a correction value.

If a threshold value for a misalignment angle is exceeded, it may be inferred that this is not only a slight misalignment, but rather that a greater misalignment of detection unit 2 has occurred as a result of an accident or a collision, and individual detection unit 2 or the entire system is shut off.

What is claimed is:

1. A device for ascertaining a misalignment of at least one detection unit fastened on a vehicle with respect to an intended sensor main beam direction, the device comprising:
  a detection unit which emits signals and receives partial signals which have been reflected on objects, and ascertains distances and azimuth angles of the reflecting objects; and
  an evaluation unit to which the ascertained distances and azimuth angles are forwarded, wherein the determination of a misalignment takes place in the evaluation unit by the evaluation unit: (i) detecting an extended object, the extended object being an object that extends along and parallel to a roadway on which the vehicle is moving, the extended object being a guardrail or a concrete wall or a tunnel wall or a bridge railing, (ii) ascertaining an averaged angle of the detected extended object by averaging over a period of time measured angles with respect to a particular sensor main beam direction of the detection unit of signals reflected by the detected extended object, (iii) comparing stored alignment of the sensor main beam direction and the ascertained averaged angle of the detected extended object, and (iv) ascertaining the misalignment based on the comparison under the assumption that the vehicle is moving on average in parallel to the detected extended object for a period during which the misalignment is ascertained.

2. The device as recited in claim 1, wherein the detection unit is a radar sensor which operates in the microwave range or the millimeter-wave range.

3. The device as recited in claim 1, wherein multiple detection units are mounted on the vehicle.

4. The device as recited in claim 3, wherein the detection areas of adjacent detection units at least partially overlap.

5. The device as recited in claim 3, wherein knowledge of the instantaneous misalignment angle of a detection unit is utilized for ascertaining the misalignment angle of an adjacently situated detection unit.

6. A method for ascertaining a misalignment of at least one detection unit fastened on a vehicle with respect to an intended sensor main beam direction, the method comprising:
  emitting signals, by a detection unit, and receiving partial signals reflected on objects;
  ascertaining distances and azimuth angles of the reflecting objects, the ascertained distances and azimuth angles of the objects being forwarded to the at least one detection unit with the aid of an evaluation unit, wherein the determination of a misalignment takes place in the evaluation unit by the evaluation unit: (i) detecting an extended object, the extended object being an object that extends along and parallel to a roadway on which the vehicle is moving, the extended object being a guardrail or a concrete wall or a tunnel wall or a bridge railing, (ii) ascertaining an averaged angle of the detected extended object by averaging over a period of time measured angles with respect to a particular sensor main beam direction of the detection unit of signals reflected by the detected extended object, (iii) comparing stored alignment of the sensor main beam direction and the ascertained averaged angle of the detected extended object, and (iv) ascertaining the misalignment based on the comparison under the assumption that the vehicle is moving on average in parallel to the detected extended object for a period during which the misalignment is ascertained.

7. The method as recited in claim 6, wherein, in order to ascertain the misalignment angle, a comparison of the stored alignment of the sensor main beam direction and the ascertained angle of the object extension with respect to the sensor main beam direction is carried out by ascertaining a difference angle between a vehicle longitudinal axis and the sensor main beam direction, and, from this, subtracting the angle value at which the detection unit ascertains the reflected partial signals of the transmission signals reflected on the extended object.

8. The method as recited in claim 6, wherein the ascertained misalignment angle is utilized for correcting an instantaneously measured object angle.

9. The method as recited in claim 8, wherein the misalignment angle used for correcting the instantaneously measured object angle is ascertained with the aid of a long-term filtering of measured values.

10. The method as recited in claim 6, wherein a shutoff of the detection unit takes place when the ascertained misalignment angle exceeds a predefined threshold value.

11. The method as recited in claim 10, wherein the misalignment angle to be ascertained for the shutoff is ascertained with the aid of a short-term filtering of the measured values.

12. The method as recited in claim 6, wherein positions of stationary objects detected in a range having the highest measuring quality are utilized for ascertaining a misalignment.

13. The method as recited in claim 12, wherein a detection unit has the highest measuring quality in a subarea of a detection area where the detection unit has at least one of: i) the greatest range, and ii) the highest angular accuracy.

14. The method as recited in claim 6, wherein, when multiple detection units are mounted on a vehicle, whereby when the detection areas of adjacent detection units at least partially overlap, knowledge of the instantaneous misalignment angle of a detection unit is utilized for ascertaining the misalignment angle of an adjacently situated detection unit.

* * * * *